Oct. 3, 1933.                W. R. KOCH                1,929,173
                        ILLUMINATING DEVICE
                        Filed Oct. 21, 1930
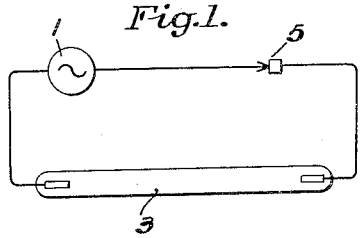
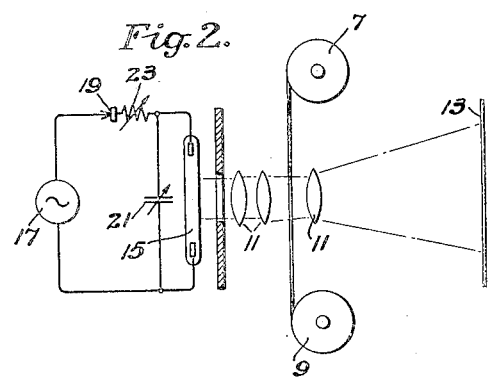
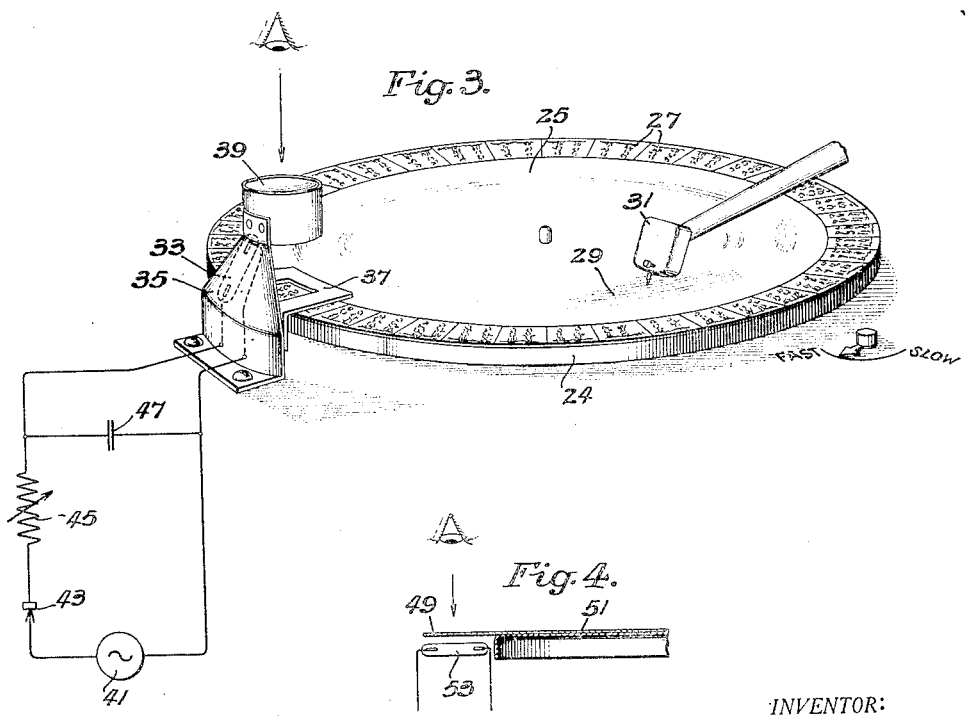
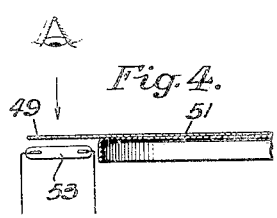
INVENTOR:
Winfield R. Koch,
BY
HIS ATTORNEY.

Patented Oct. 3, 1933

1,929,173

UNITED STATES PATENT OFFICE 1,929,173

ILLUMINATING DEVICE

Winfield Rudolph Koch, Camden, N. J., assignor, by mesne assignments, to Radio Corporation of America, New York, N. Y., a corporation of Delaware Application October 21, 1930. Serial No. 490,165

7 Claims. (Cl. 88—16.2)

My invention relates to illuminating devices and it has particular relation to devices for momentarily illuminating an object at definite intervals.

For many industrial purposes, it is desirable to provide means for intermittently illuminating an object. For example, if moving machinery is examined by means of intermittent illumination, the frequency of the light flashes being synchronized with the movement of the machinery, the separate parts thereof appear to the observer to be standing still and their action under various conditions can be noted. Again, in the motion picture art, it is customary to interpose a shutter between a continuous light source and a film and to so time the shutter with respect to the periods of motion and rest of the film that the film is illuminated only during the rest periods.

In apparatus for examining machinery and the like, use is often made of a neon tube energized from any convenient source, such as alternating current at 25 or 60 cycles. Should the movement of the machine, however, be at such a rate that 120 light impulses per second do not furnish the proper illumination, it is customary to make use of mechanically actuated contact making and breaking apparatus for the purpose of properly timing the light impulses. Such apparatus is, of course, subject to wear and tear and is, for that reason, somewhat undesirable.

It is, accordingly, an object of my invention to provide means whereby intermittent illumination of an object may be obtained without resorting to mechanically actuated parts.

Another object of my invention is to provide means whereby alternating current may be employed to intermittently and automatically energize a light source at a frequency less than the total number of half-cycles per second of the said source.

Another object of my invention is to provide an intermittently energized light source suitable for use in motion picture projection apparatus.

A still further, and more specific, object of my invention is to provide combined picture and sound reproduction apparatus wherein intermittent illumination of the pictures is obtained without making use of mechanically actuated circuit making and breaking devices.

The aforementioned objects I prefer to attain in a commercial embodiment of my invention by providing a light source such as a neon tube, which requires a definite striking-potential, a source of alternating potential, and a totalizing device which may be so pre-adjusted that a definite number of cycles of potential from the potential source is stored therein before the striking-potential of the light source is reached. Specifically, I prefer to connect the terminals of a neon tube to a source of alternating potential over a path which includes a rectifying device and a resistance element, and I connect a capacitor in shunt relation to the said terminals to serve as the totalizing device.

The novel features that I consider characteristic of my invention are set forth with particularity in the appended claims. The invention itself, however, both as to its organization and its method of operation, together with additional objects and advantages thereof, will best be understood from the following description of certain specific embodiments, when read in connection with the accompanying drawing, in which:

Fig. 1 is a diagrammatic view of a light source connected to a source of potential in accordance with my invention, Fig. 2 is a diagrammatic view of a motion picture projecting device comprising a light source energized according to my invention, Fig. 3 is a view, partly in perspective and partly diagrammatic, exemplifying a combined sound and picture reproducing device comprising a preferred embodiment of my invention, and Fig. 4 is a fragmentary view illustrating an alternative mode of disposing a light source in operative relation to a disc carrying a plurality of translucent views.

Assuming, for purposes of explanation, that a source 1 of 60 cycle potential is available, this source may be employed as illustrated in Fig. 1 to so energize a neon tube 3 that 60 flashes of light per second are obtained therefrom by interposing a rectifier 5 between one terminal of the potential source and a terminal of the tube. The rectifier, which in a preferred commercial embodiment of my invention is of the copper oxide disc type manufactured by the Westinghouse Electric & Manufacturing Company and known as "Rectox", suppresses each alternate half-cycle from the 60 cycle source with the result that the tube, instead of flashing 120 times per second, flashes 60 times per second.

For many purposes, 60 light flashes per second are satisfactory; for motion picture projection, however, it is necessary that a smaller number of flashes, 15 for example, be employed.

For the purpose of obtaining, from a 60 cycle potential source, a lesser number of flashes than 60 per second, I prefer to connect a totalizing device in shunt relation to the terminals of the neon tube and to so choose the electrical constants of the system that a definite number of positive or negative pulses is required to charge the totalizing device to the flash-potential of the tube.

Referring specifically to Fig. 2 of the drawing, a motion picture projector is exemplified by an upper magazine 7, a lower magazine 9, a plurality of lenses 11 and a screen 13 on which the picture is thrown. A neon tube 15 is disposed coaxially of the lens system and the terminals thereof are connected to a source 17 of alternating potential over a circuit that includes a rectifying device 19. A condenser 21 is connected in shunt relation to the terminals of the tube and may be of either the fixed or variable type.

A resistance element 23 is interposed between the rectifier and one terminal of the neon tube, the said element preferably being variable.

The potential source, although illustrated as being a generator, may, of course, be the secondary winding of a transformer if the primary voltage available is not correct.

In the operation of the system as illustrated, each alternate half-cycle delivered from the potential source adds an increment to the charge taken by the condenser. If the magnitude of the resistor and the capacity of the condenser are properly chosen, the number of impulses necessary to charge the condenser to the flash-potential of the tube may be predetermined with exactness. The neon tube, therefore, periodically flashes and, by properly adjusting the rate of travel of the film, the flashes may be made to coincide with the momentary position of each of the successive frames of the picture at the axis of the optical system, the periods of darkness of the tube corresponding to the passage of the boundary between one frame and the next succeeding frame in front of the projection point.

My invention is also particularly applicable to toy sound and picture reproducing devices. A toy reproducer is exemplified by Fig. 3 of the drawing, and comprises a turntable 24, on which may be disposed a combined sound and picture record constituted by a disc 25 having a peripheral series of views 27 and a sound track 29 thereon. The device is provided with a sound pickup element 31 which may be of either the electrical or the mechanical type, preferably the latter, if the entire apparatus is to be sold at a reasonable price.

The picture-viewing portion of the device is constituted by a neon lamp 33 disposed within a reflector 35, a "frame" 37 that projects horizontally over the peripheral series of views, and a magnifying glass 39.

The neon tube is energized from any convenient source 41 of alternating potential, as hereinbefore described, and a rectifier 43, a resistor 45 and a capacitor 47 are provided for the purpose of timing the flashes.

If the disc were provided with 120 views and rotated at 60 R. P. M. it would, of course, be unnecessary to provide the totalizing condenser, the rectifier, and the resistor, but in such event, since the complete action would be seen during a single revolution of the disc, it would be impossible to provide a sound record of any appreciable length. I, therefore, contemplate so choosing the number of separate views on the disc and so disposing them in non-consecutive relation that, if each second, third, fourth, fifth, sixth, etc. view is observed, it will require a plurality of revolutions to complete the action. In such event, the sound record may be constituted by a plurality of spiral turns and it may be more or less synchronized with the views.

For example, assume that "V" views per second are necessary to obtain an illusion of motion sufficiently satisfactory for a toy of the type described, that the sound record requires "R" revolutions for its completion, and that the disc travels 60 revolutions per minute. The total number of pictures P, that would satisfactorily accompany the sound record, in such event, is given by the formula;

$$P = (R \times V) - (R-1)$$

The factor (R—1) also gives the number of unexposed views or frames interposed between each pair of successive consecutive views that are illuminated by the light flashes during the rotation of the disc.

For example, if the sound record requires 13 complete revolutions of the disc for its completion, if the disc rotates once per second, and if 10 views per second are contemplated, when these figures are substituted in the formula, it will be found that 118 views are required and that 12 unilluminated views intervene between each pair of consecutive views.

In every instance, it will be noted that the total number of views and the approximate number of revolutions required to completely play the sound record have no common integral divisor and that the viewing of consecutive frames progresses in the direction of rotation of the disc until the entire number of frames has been exposed.

It also lies within the scope of my invention to provide means for mounting a plurality of translucent views 49 upon the periphery of a disc 51 as exemplified by Fig. 4 of the drawing and to observe the views by means of light transmitted therethrough from a neon tube 53, instead of by light reflected from the surface thereof as is the case with the device shown in Fig. 3.

It will, accordingly, be apparent that I have, by my invention, provided novel means for energizing a neon tube, and have exemplified the practical advantages of my invention by explaining its adaptation to stroboscopes, motion picture projecting devices, and combined sound and picture reproducers.

Many modifications of my invention will be apparent to those skilled in the art to which it pertains and it is not to be limited except insofar as is necessitated by the prior art and by the spirit of the appended claims.

I claim as my invention:

1. In combination, an endless picture carrying element having consecutive pictures arranged thereon in non-consecutive but regularly recurring order, means for advancing said picture element past a viewing point, means for illuminating said element at said point, and means for energizing said illuminating means with the same periodicity as the recurrent order of said consecutive pictures.

2. In combination, an endless picture carrying element having consecutive pictures arranged thereon in non-consecutive but regularly recurring order, means for advancing said picture element past a viewing point, means for illuminating said element at said point, a potential source, and reactive means for periodically permitting said potential source to energize said illuminating means with the same periodicity as the recurrent order of said consecutive pictures.

3. In combination, an endless picture carrying element having consecutive pictures arranged thereon in non-consecutive but regularly recurring order, means for advancing said picture element past a viewing point, means for illuminating said element at said point, a source of alternating potential, and means including a rectifier and a reactor for periodically permitting said potential source to energize said illuminating means with the same periodicity as the recurrent order of said consecutive pictures.

4. In combination, a sound picture record wherein consecutive pictures are arranged in endless and non-consecutive but regularly recurring order, means for deriving sound from said record, means for illuminating said picture record, and means for energizing said illuminating means with the same periodicity as the recurrent order of said consecutive pictures.

5. In combination, a sound picture record wherein consecutive pictures are arranged in endless and non-consecutive but regularly recurring order, means for deriving sound from said record, means for illuminating said picture record, a source of alternating potential, and means including a rectifier and a reactor for permitting said potential source to energize said illuminating means with the same periodicity as the recurrent order of said consecutive pictures.

6. In combination, a combined sound and picture record comprising a continuous sound record and an endless series of pictures contiguous thereto, consecutive pictures being disposed on said record in non-consecutive but regularly recurring order, means for continuously advancing said record, means for reproducing sound from the sound record as said record is advanced, means for illuminating said pictures, and means for energizing said illuminating means in timed relation with the appearance of consecutive pictures of the record at the viewing point thereof.

7. In combination, a combined sound and picture record comprising a continuous sound record and an endless series of pictures contiguous thereto, consecutive pictures being disposed on said record in non-consecutive but regularly recurring order, means for continuously advancing said record, means for reproducing sound from the sound record as said record is advanced, means for illuminating said pictures, an AC source for energizing said illuminating means to produce picture illuminating flashes, and means for so timing said flashes as to illuminate consecutive pictures of the record in the order of their appearance at the viewing point thereof.

WINFIELD RUDOLPH KOCH.